US010048936B2

(12) United States Patent
Maker, III

(10) Patent No.: US 10,048,936 B2
(45) Date of Patent: Aug. 14, 2018

(54) AUDIO COMMAND INTERFACE FOR A MULTIMEDIA DEVICE

(71) Applicant: ROKU, INC., Saratoga, CA (US)

(72) Inventor: Frank Llewellyn Maker, III, Livermore, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 14/857,876

(22) Filed: Sep. 18, 2015

(65) Prior Publication Data

US 2017/0060530 A1    Mar. 2, 2017

Related U.S. Application Data

(60) Provisional application No. 62/212,423, filed on Aug. 31, 2015.

(51) Int. Cl.
| | |
|---|---|
| *G10L 25/90* | (2013.01) |
| *G06F 3/16* | (2006.01) |
| *H04N 21/422* | (2011.01) |
| *H04N 21/439* | (2011.01) |
| *H04N 21/658* | (2011.01) |
| *G10L 13/08* | (2013.01) |

(Continued)

(52) U.S. Cl.
CPC ....... *G06F 3/167* (2013.01); *H04N 21/42203* (2013.01); *H04N 21/42222* (2013.01); *H04N 21/4394* (2013.01); *H04N 21/6581* (2013.01); *H04N 21/64322* (2013.01)

(58) Field of Classification Search
USPC .............. 704/260, 233, 203, 275, 205, 243; 700/94; 707/769
See application file for complete search history.

(56) References Cited

U.S. PATENT DOCUMENTS

| | | | |
|---|---|---|---|
| 6,427,140 B1 * | 7/2002 | Ginter ..................... G06F 21/10 | 348/E5.006 |
| 8,484,022 B1 * | 7/2013 | Vanhoucke ........... G10L 15/063 | 700/48 |

(Continued)

FOREIGN PATENT DOCUMENTS

EP    1890463 A1    2/2008

OTHER PUBLICATIONS

International Search Report and Written Opinion of the International Searching Authority for International Application No. PCT/US2016/049677, dated Dec. 16, 2016, 13 pages.

*Primary Examiner* — Neeraj Sharma
(74) *Attorney, Agent, or Firm* — Sterne, Kessler, Goldstein & Fox P.L.L.C.

(57) ABSTRACT

System, method, and computer product embodiments for processing audio commands are described. A multimedia device receives a digitized audio sequence from a control device. The digitized audio sequence is associated with a display command for controlling a display device. Then, the digitized audio sequence is converted into an audio signature that corresponds to the digitized audio sequence. The multimedia device sends the audio signature to a platform server configured to use the audio signature to process the display command. After, the multimedia device receives content information from the platform server resulting from processing the display command. Then, the multimedia device causes the display device to provide media content related to the content information.

20 Claims, 8 Drawing Sheets

(51) Int. Cl.
*G10L 15/20* (2006.01)
*G10L 21/02* (2013.01)
*G10L 15/06* (2013.01)
*G06Q 20/20* (2012.01)
*G06F 17/30* (2006.01)
*G06F 17/10* (2006.01)
*G06F 21/30* (2013.01)
*H04M 1/12* (2006.01)
*H04N 21/643* (2011.01)

(56) References Cited

U.S. PATENT DOCUMENTS

| | | | |
|---|---|---|---|
| 8,831,677 B2* | 9/2014 | Villa-Real | H04M 1/66 455/552.1 |
| 8,868,428 B2* | 10/2014 | Gruenstein | G10L 15/30 386/231 |
| 9,301,070 B2* | 3/2016 | Fonseca, Jr. | H04R 29/00 |
| 2003/0145062 A1 | 7/2003 | Sharma et al. | |
| 2004/0117636 A1* | 6/2004 | Cheng | G06F 21/32 713/185 |
| 2004/0199387 A1* | 10/2004 | Wang | G06Q 30/06 704/243 |
| 2006/0149532 A1* | 7/2006 | Boillot | G10L 19/26 704/203 |
| 2008/0027726 A1* | 1/2008 | Hansen | G10L 13/00 704/260 |
| 2008/0215315 A1* | 9/2008 | Topchy | H04H 60/58 704/205 |
| 2008/0249961 A1* | 10/2008 | Harkness | G06Q 30/0283 705/400 |
| 2010/0131272 A1* | 5/2010 | Wu | G06F 21/32 704/243 |
| 2011/0078172 A1* | 3/2011 | LaJoie | G06F 17/30775 707/769 |
| 2012/0143612 A1 | 6/2012 | Yu et al. | |
| 2012/0203363 A1* | 8/2012 | McKenna | G10L 19/018 700/94 |
| 2013/0246457 A1* | 9/2013 | Stojancic | G06F 17/30023 707/769 |
| 2014/0058732 A1* | 2/2014 | Labsky | G10L 15/30 704/254 |
| 2014/0163996 A1 | 6/2014 | Sureka et al. | |
| 2014/0236582 A1 | 8/2014 | Raychowdhury et al. | |
| 2014/0278393 A1* | 9/2014 | Ivanov | G10L 15/20 704/233 |
| 2015/0287408 A1* | 10/2015 | Svendsen | G10L 15/26 704/235 |

\* cited by examiner

US 10,048,936 B2

AUDIO COMMAND INTERFACE FOR A MULTIMEDIA DEVICE

CROSS REFERENCE TO RELATED APPLICATIONS

This application claims the benefit of U.S. Provisional Patent Application No. 62/212,423, filed Aug. 31, 2015, titled "AUDIO COMMAND INTERFACE FOR A MULTIMEDIA DEVICE," which is hereby incorporated herein by reference in its entirety.

FIELD

This disclosure is generally directed to processing audio commands with a multimedia device.

BACKGROUND

A content consumer may use a control device, such as a remote control, to specify a command to a multimedia device to access channels, such as data streams, from content providers in a network, such as the Internet. Conventionally, in order to view the channel on a television display, the consumer may need to operate the control device to manually input a channel identifier that specifies the channel. The command may be manually input via a keyboard-based interface, such as entering a channel number, using channel up/down keys, or traversing a menu such as a channel guide. But, this conventional approach can be slow and inefficient, and has limited ability to enhance the user's viewing experience by, for example, enabling access to content related to a channel being viewed.

BRIEF SUMMARY

Provided herein are system, method, article of manufacture and/or computer product embodiments, and/or combinations and sub-combinations thereof, for providing a media content referenced by a display command based on retrieving the display command using a received digitized audio sequence. In an embodiment, a multimedia device may receive the digitized audio sequence, representative of an audio command, from a control device. The digitized audio sequence may be further associated with a display command for controlling a display device. The multimedia device may convert the digitized audio sequence into an audio signature that identifies the digitized audio sequence. The audio signature may be sent to a platform server configured to use the audio signature to process the display command. Upon receiving content information from the platform server as a result of processing the display command, the multimedia device may cause the display device to provide media content related to the received content information.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, method, article of manufacture and/or computer product embodiments, and/or combinations and sub-combinations thereof, for providing a media content referenced by a display command based on retrieving the display command using a received digitized audio sequence.

Figure 1:
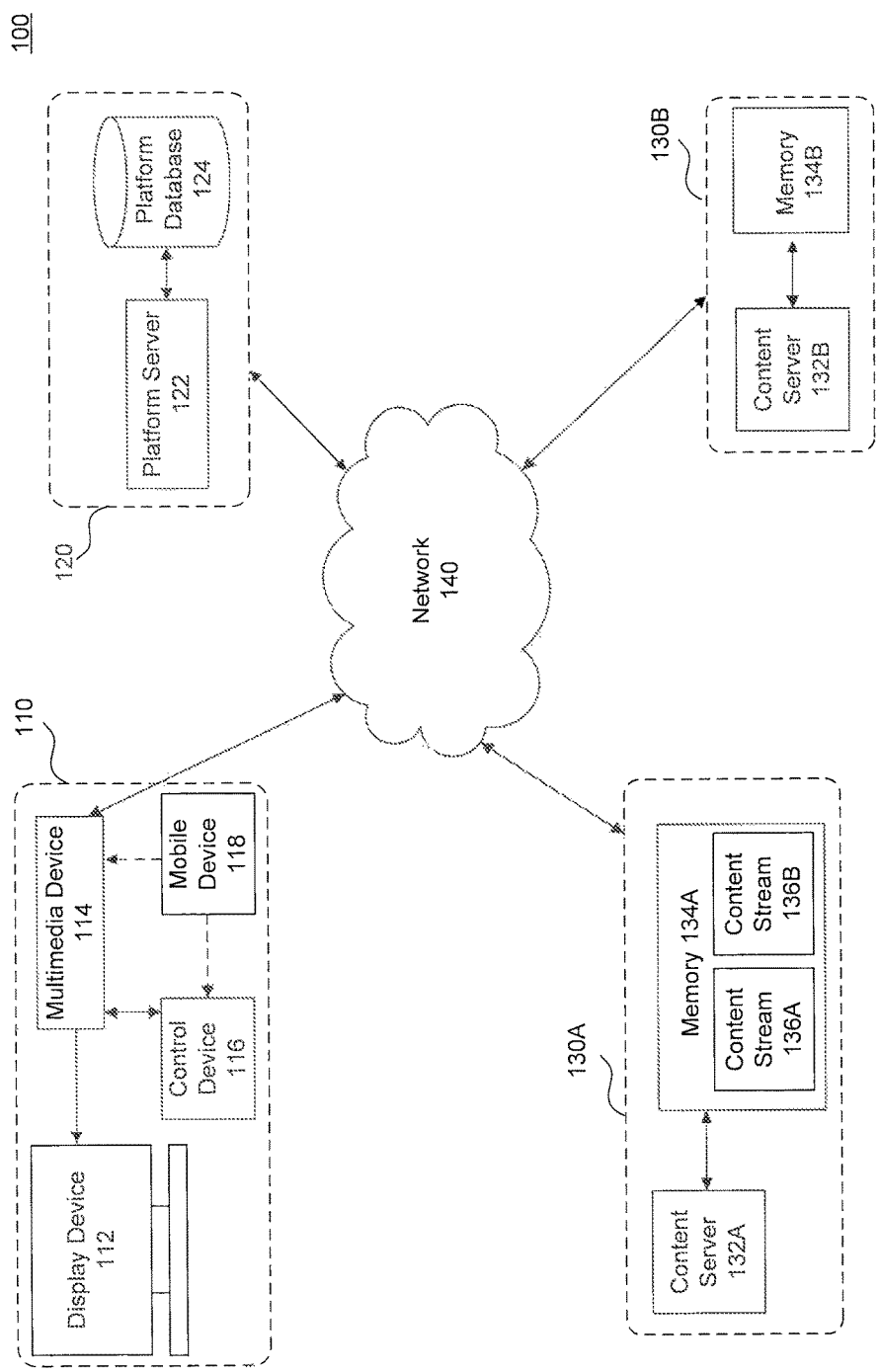
FIG. 1 is a block diagram of an audio command processing system, according to an embodiment.

FIG. 1 illustrates an audio command processing system 100, according to an embodiment. Audio command processing system 100 includes interface system 110, platform system 120, and content source systems 130. Interface system 110, platform system 120, and content source systems 130 may communicate with each other via network 140. Network 140 may be representative of a wide area network (WAN), such as the Internet, or any point-to-point or multipoint-to-multipoint networking protocols. Other wired and/or wireless communication techniques, protocols, and technologies may similarly be used. In an embodiment, network 106 may include private, public, academic, business, and government networks.

Interface system 110 may include display device 112, multimedia device 113, control device 116, and mobile device 118. Though not depicted, one or more of each of these devices may be included in interface system 110. In an embodiment, devices of interface system 110 may be in close proximity and be configured to communicate with each other using one or more networks different from network 140. For example, multimedia device 114 may communicate with control device 116 or mobile device 118 via a communication protocol designed for low-power consumption, such as BLUETOOTH.

Display device 112 may be a hardware device specifically designed for viewing media content including, for example, a monitor, a television screen, or a projector display. In an embodiment, display device 112 may have a screen area more suitable, e.g. having a much larger screen area, for viewing media content than mobile device 118 or another display device having a small screen.

Multimedia device 114 may be a computing device that manages multimedia content to be output on display device 112. Example multimedia content may be data that is a combination of one or more of text, audio, still images, video, etc. In an embodiment, multimedia device 114 may be a streaming stick or streaming player that is coupled to or integrated within (not shown) display device 112. Multimedia device 114 may also be coupled to other computing devices, such as a digital video recorder (DVR) or a digital video disc (DVD) player. The coupling may be provided via a variety of cabling methods, such as via composite cables or High-Definition Multimedia Interface enabled cables.

In an embodiment, multimedia device 114 may be a data streaming device that provides a content stream, such as content stream 136A from content source system 130A, via network 140 for display by display device 112 coupled to multimedia device 114. Content stream 136 may include, for example, multimedia content, such as movies, television episodes, advertisements, commercials, news, streaming channels, video clips, video games, on-demand video content, and photos.

Figure 2:
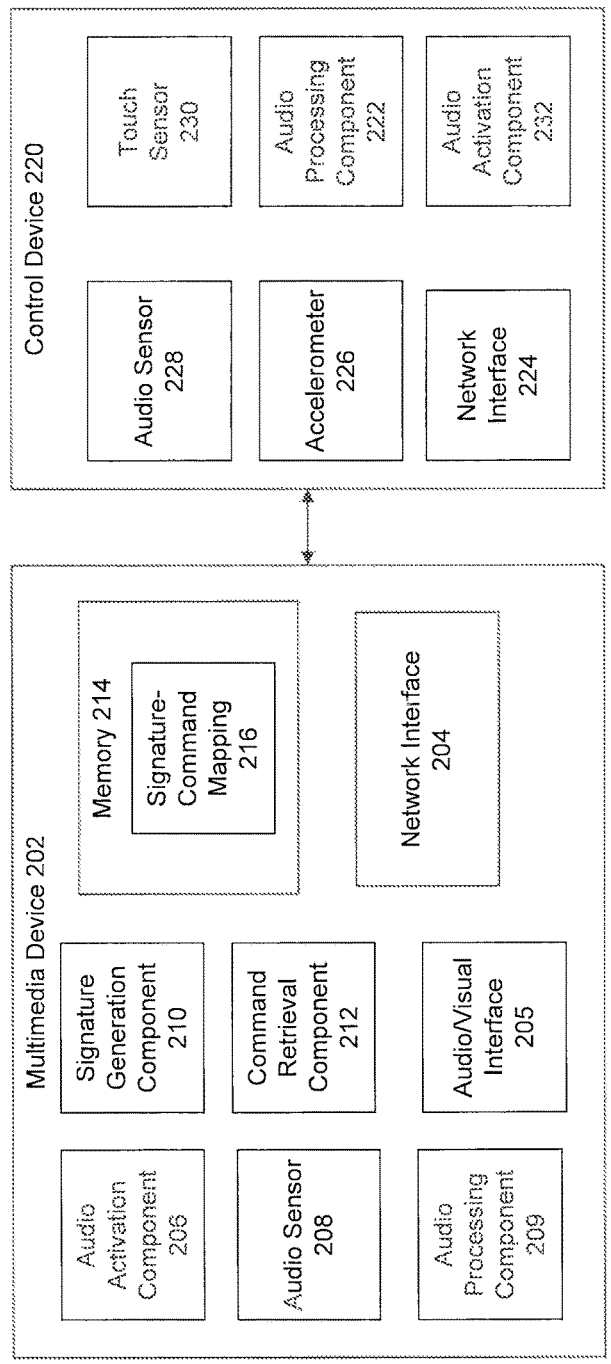
FIG. 2 is a block diagram of systems including a remote control and a multimedia device, according to an example embodiment.

In an embodiment, multimedia device 114 may be configured to manage multimedia content based on a sound associated with an audio command and captured by control device 116, further described in FIG. 2. Audio command processing may be enabled based on communications between multimedia device 114 and control device 116, and between multimedia device 114 and platform system 120.

Control device 116 may be a portable and wireless device that issues commands to multimedia device 114 to access or manipulate multimedia content, such as content stream 136A, displayed on display device 112. In an embodiment, control device 116 may be a remote control configured to interact with multimedia device 114 and other devices, such as display device 112, DVD players, or DVRs.

In an embodiment, control device 116 may include buttons for activating multimedia device 114, turning display device 112 on and off, channel selection buttons, volume control buttons, channel shortcut buttons, accessing menus, and programmable "favorites" buttons that store a shortcut to favorite channels, content streams 136, etc. Though buttons may enable a simple and efficient interface for issuing commands to access content, control device 116 may be limited in the number of buttons it has available.

In an embodiment, control device 116 may be configured to allow for more commands (possibly at a finer granularity) by enabling a traditional keyboard interface for issuing commands, such as adding content streams 136 or navigating to content streams 136 stored by content source systems 130. For example, control device 116 may include a physical keyboard or a virtual keyboard on a touch screen of control device 116 that enables a content consumer to manually input and identify desired content stream 136. In an embodiment, control device 116 may include relative directional controls (e.g., left, right, up, down, backwards, forwards) to operate a virtual keyboard displayed on display device 112. A keyboard interface, however, is commonly inconvenient for the content consumer to use.

In an embodiment, control device 116 may be configured to receive a sound and detect an audio command from the sound instead of requesting the content consumer to manually input a display command corresponding to the audio command. Control device 116 may convert or digitize the audio command into a digitized audio sequence issued to multimedia device 114, further described in reference to FIG. 2. The digitized audio sequence may be representative of, for example, a sequence of sinusoidal tones. As a result of the audio command interface, content consumers may not need to use the limited number of buttons or use inefficient keyboard interfaces. The audio command may effectively operate as a button for accessing and requesting display device 112 to display a particular media content.

In an embodiment, the audio command issued by control device 116 to multimedia device 114 instructs multimedia device 114 to determine a corresponding display command that causes or requests display device 112 to display a media content or content stream associated with the audio command. The audio command, however, need not be so limited. For example, an audio command may request multimedia device 114 to perform other operations over network 140, such as visit a web page, receive a text message, initiate a web conference, or dial a number. Multimedia device 114 may then issue the corresponding display command to display device 112 to request any visual or audio content associated with the operations to be provided and output by display device 112. Similar to the audio command, the display command corresponding to the audio command may not be limited to displaying or outputting media content on display device 112. In an embodiment, the display command may be any command to operate display device 112. The display command may be, for example, preference requests that changes a layout or a preferred setting of display device 112. Other possible display commands may include initiating a web conference or a video chat to be presented on display device 112.

Therefore, content consumers using the audio command interface retain the fine-granularity of options provided by the inefficient keyboard interfaces. For example, a content consumer may no longer need to use control device 116 to first select or input a content provider, such as NETFLIX, then select or input a particular data stream, such as a movie, from NETFLIX. Instead, an emitted audio command may be captured by control device 220 and the audio command specifies the data stream of the provider.

In an embodiment, the sound, which is associated with an audio command, used in the audio command interface and detected by control device 116, may be inaudible to humans, e.g., above 20 kHz audible, or audible to humans, e.g., between 20 Hz and 20 kHz. In an embodiment, audible sounds may include a short snippet, e.g., less than ten seconds, of audio from a media content containing an audio component. For example, the snippet may be from a song, a television show, a video clip on the Internet, or an advertisement. In an embodiment, the sound from which an audio command is detected may be a sound selected by platform system 120 or content source systems 130.

Mobile device 118 may be a portable computing device having a screen that is not optimally-sized for viewing media content or content stream 136. In an embodiment, the screen of mobile device 118 is not optimal because it is smaller than the screen of display device 112. For example, mobile device 118 may be a lightweight (e.g. under 2 lbs.) device including smartphones, tablets, laptops, or other portable devices. Mobile device 118 may download and install an audio command application from platform system 120, that when executed by mobile device 118, causes mobile device 118 to simulate functionality of control device 116. In an embodiment, the audio command application may provide further functionality not provided by control device 116 depending on mobile device 118 hardware or software capabilities and versions. In an embodiment, mobile device 118 may be a source of the sound received or detected by control device 116 or multimedia device, if enabled and configured on multimedia device 114.

Platform system 120 may include platform server 122 and platform database 124. Platform database 124 may contain configurations data needed by multimedia device 114, control device 116, or mobile device 116 to enable audio command processing, further described in FIG. 4. Platform server 122 may be implemented by one or more processors to install the needed configurations from platform database 124 into multimedia device 114, control device 116, and mobile device 116. In an embodiment, platform server 122 may install configuration software to control device 116 via multimedia device 114.

Content source systems 130, such as content source system 130A, may include content server 132 and memory 134. Content server 132 may store in memory 134 content streams 136 to be sent to multimedia device 114 via network 140 and displayed by display device 112. To store content streams 136, memory 134 may include database storage or non-volatile storage discussed, for example, in detail in FIG. 6. Content server 108 may also distribute content stream 136 network 140. At the request of multimedia device 114, content server 132 provides requested content stream 136 to multimedia device 114 for streaming and eventual display on display device 112.

In an embodiment, content server 132A may assign a channel identifier or a Uniform Resource Indicator (URI) to, for example, content stream 136A, such that a device having the authorization to access content stream 136A may retrieve and view content stream 136A via network 140. For example, the device may be multimedia device 114 or mobile device 116. This channel identifier may be stored in platform database 124 to enable audio command processing, further described in FIG. 4. In an embodiment, the URI may be a Uniform Resource Locator (URL) or a web address.

In an embodiment, content server 132A may assign a sound snippet to be associated with content stream 136A. Then, content server 132A may send the sound snippet and the URI identifying a location of content stream 136A to platform system 120. Platform server 122 may be configured to derive an audio signature based on the sound snippet and store within platform database 124 an association between the audio signature and a display command to retrieve content stream 136A using the URI.

FIG. 2 is a block diagram 200 of systems including control device 220 and multimedia device 202, according to an example embodiment.

Control device 220 may be an example of control device 116 of FIG. 1 or any other device that simulates the functionality of control device 220. In an embodiment, multimedia device 202 may be configured to obtain a display command corresponding to an audio command and request display device 112 to perform the display command. Control device 220 may be configured to capture a sound and detect from the sound the audio command that is sent to multimedia device 202 via network interface 224 within control device 220.

Network interface 224 may include receivers and transmitters to enable wireless communications between control device 220 and multimedia device 202 or, in an embodiment, mobile device 118 of FIG. 1. In an embodiment, network interface 224 may include circuitry for enabling a low-power wireless protocol, such as BLUETOOTH or another proprietary or custom protocol, between only devices, such as multimedia device 202, configured to communicate with control device 220.

In an embodiment, control device 220 includes audio sensor 228, audio processing component 222, and audio activation component 232. Control device 220 may also include one or more consumer-usage sensors, such as accelerometer 226 or touch sensor 230, for detecting whether a content consumer is operating control device 220.

In an embodiment, accelerometer 226 may detect that control device 220 is being moved by the content consumer, which suggests the content consumer is using or wishes to use control device to, for example, capture an audio command to be processed by multimedia device 202.

In an embodiment, touch sensor 230 may be a physical button, that when pressed, activates audio command capturing and issuing capabilities of control device 220. Touch sensor 230 may detect that the physical button has been pressed or is being pressed by, for example, the content consumer. In an embodiment, touch sensor 230 may be a virtual button or portion of a touch screen display hardware built into control device 220. In this example, touch sensor 230 may be configured using capacitive sensing or resistive sensing. Touch sensor 230 may generate an indication that the virtual button or portion of the touch screen display is touched by the content consumer.

In an embodiment, wireless-based technologies may be incorporated in control device 220 to determine that a content consumer is in close proximity with control device 220 and likely to operate control device 220. For example, a radio-frequency identification (RFID) tag reader (not depicted) may be built into control device 220 for detecting an RFID tag within a mobile device, such as mobile device 118, when mobile device 118 is in close proximity to control device 220. In an example, a low-power wireless protocol sniffer may be implemented on control device 220 to poll for a presence or close proximity of mobile device 118 implementing the low-power wireless protocol. In an example, control device 220 may include a wake on wireless LAN driver configured to receive a network packet as an indication to remotely activate audio command capturing capabilities on control device 220. In this example, the network packet may be received from a remote device and need not be mobile device 118 that is in close proximity to control device 220.

Audio activation component 232 may be configured to activate or enable audio sensor 228 to start capturing sounds and detecting audio commands from sounds near control device 220 when an activation indication from one or more of the sources described above is received. Audio sensor 228 may be, for example, a microphone configured to capture sounds containing audio commands. In an embodiment, audio activation component 232 may be configured to recognize voice commands parsed from sounds captured from audio sensor 228. In this embodiment, a specific voice command may be received as an activation indication to enable audio command processing.

In an embodiment, audio sensor 228 may actively capture sounds and send an activation indication to audio activation component 232 if an intensity of the captured sound exceeds a threshold or if the intensity of the sound in a predetermined frequency range exceeds a threshold programmed into control device 220.

Audio processing component 222 may be configured to, alone or in combination with audio sensor 228, convert an audio command from the sound to a digitized audio sequence. This conversion may be accomplished using analog-to-digital converters (ADC) implemented in audio processing component or audio sensor 228. In an embodiment, audio processing component 222 may include one or more filters, such as a low-pass filter, to reduce noise in the sound. Subsequently, audio processing component 222 may send the generated digitized audio sequence, which may be filtered, to multimedia device 202 via network interface 224.

Multimedia device 202 may be an example of multimedia device 114 of FIG. 1 or any other device that communicates with control device 220 and display device 112 of FIG. 1 as described. In an embodiment, multimedia device 202 may be configured to perform the sound capturing and audio command generation functionality of control device 220 described above. Therefore, multimedia device 202 may include audio/visual interface 205, audio activation component 206, audio sensor 208, and audio processing component 209, each of which corresponds to the similarly named counterparts in control device 220.

Network interface 204 may include receivers and transmitters to enable wireless communications between multimedia device 202 and control device 220 or, in an embodiment, mobile device 118. In an embodiment, network interface 224 may include circuitry for enabling a low-power wireless protocol, such as BLUETOOTH or another proprietary or custom protocol, between only devices, such as control device 220, configured to communicate with multimedia device 202.

Audio/visual interface 205 may include circuitry for supporting communicating multimedia content from multimedia device 202 to display device 112 of FIG. 1. Audio/visual interface 205 may include, for example, circuitry supporting High-Definition Multimedia Interface ("HDMI®"), composite cables, V-by-one HS cable, low-voltage differential signaling ("LVDS") cable or other connecting means.

In an embodiment, multimedia device 202 may have more lenient power requirements because multimedia device may be wired powered or may contain a larger battery. So, network interface 204 may include a network card for enabling communication protocols and standards that may be more secure and enable greater bandwidths, but have higher power consumption costs. An example standard may be WIFI for communicating with other devices, such as mobile device 118 also implementing the same standard.

Signature generation component 210 may be configured to generate an audio signature based on a digitized audio sequence received from a receiver of network interface 204. In an embodiment, the audio signature may be a number (or alphanumeric sequence of characters) that uniquely identifies the digitized audio sequence. As discussed above, the digitized audio sequence may be generated by control device 220 based on an audio command detected or extracted from a sound captured by control device 220. In an embodiment where multimedia device 202 is configured to detect an audio command, signature generation component 210 may receive an associated digitized audio sequence from audio processing component 209.

In an embodiment, signature generation component 210 may be configured to derive the audio signature by first performing a Fast Fourier Transform (FFT)-based algorithm to convert the digitized audio sequence representing a signal in the time domain to a corresponding representation in the frequency domain. A graph generated in the frequency domain graph depicts the intensity or magnitude of each frequency across a spectrum of frequencies.

In an embodiment, signature generation component 210 may be configured to then use one or more features or characteristics of the graph generated in the frequency domain to generate the audio signature. For example, in an embodiment, signature generation component 210 may calculate an area defined by the graph in the frequency domain to be the audio signature or a component of the audio signature.

In an embodiment, more than one feature may be used to generate the audio signature. For example, a feature, such as the number of peaks in the graph above a threshold, may be concatenated or combined with another feature, such as the area defined by the graph, to generate the audio signature unique to the digitized audio sequence.

Command retrieval component 212 may be configured to attempt to find a display command associated with the generated audio signature from signature-command mapping 216 of memory 214. Signature-command mapping 216 may be associations between audio signatures and display commands that have been cached in memory 214. In an embodiment, signature-command mapping 216 may contain a subset of associations received from platform system 120. These associations may be stored in a hash map data structure where the audio signatures are keys that may be used in a hash function to determine a corresponding display command. The cached display commands may be the most recent display commands requested by multimedia device 202 or be popular display commands identified by platform system 120. For example, a popular display command may be a reference to a popular content stream 136, such as a recent movie or popular television content. In an embodiment, the multimedia device may not contain the cache of commands in signature-command mapping 216.

In an embodiment, command retrieval component 212 may execute an algorithm that converts the generated audio signature into the display command. In an embodiment, the algorithm may use signature-command mapping 216 stored in memory 214. Therefore, command retrieval component 212 may not need to send the audio signature to platform system 120 configured to determine the corresponding display command. In an embodiment, if command retrieval component 212 did not find a display command in signature-command mapping 216 based on the audio signature, command retrieval component 212 may send the audio signature to platform system 120. Command retrieval component 212 may not find or determine the display command if the retrieval component 212 does not, for example, cache any display commands, cache the display command corresponding to the audio signature, or contain the algorithm needed to convert the audio signature into the corresponding display command. Upon receiving the audio signature, platform server 122 may be configured to determine a display command corresponding to the audio signature.

In an embodiment, command retrieval component 212 may receive the display command from platform system 120 or from memory 214 if command retrieval component 212 found that signature-command mapping 216 contained the display command. Based on the retrieved display command, command retrieval component 212 may cause display device 112 to display content media associated with the display command. As described in FIG. 1, the display command may be associated with a URI identifying a location of media content or content stream accessible via network 140.

In an embodiment, as part of processing or determining the display command, platform server 122 may retrieve content information, which may include or indicate the content media, associated with the display command. So, command retrieval component 212 may receive the retrieved content information instead of the display command. Likewise, command retrieval component 212 may cause display device to provide media content related to the received content information.

Figure 3:
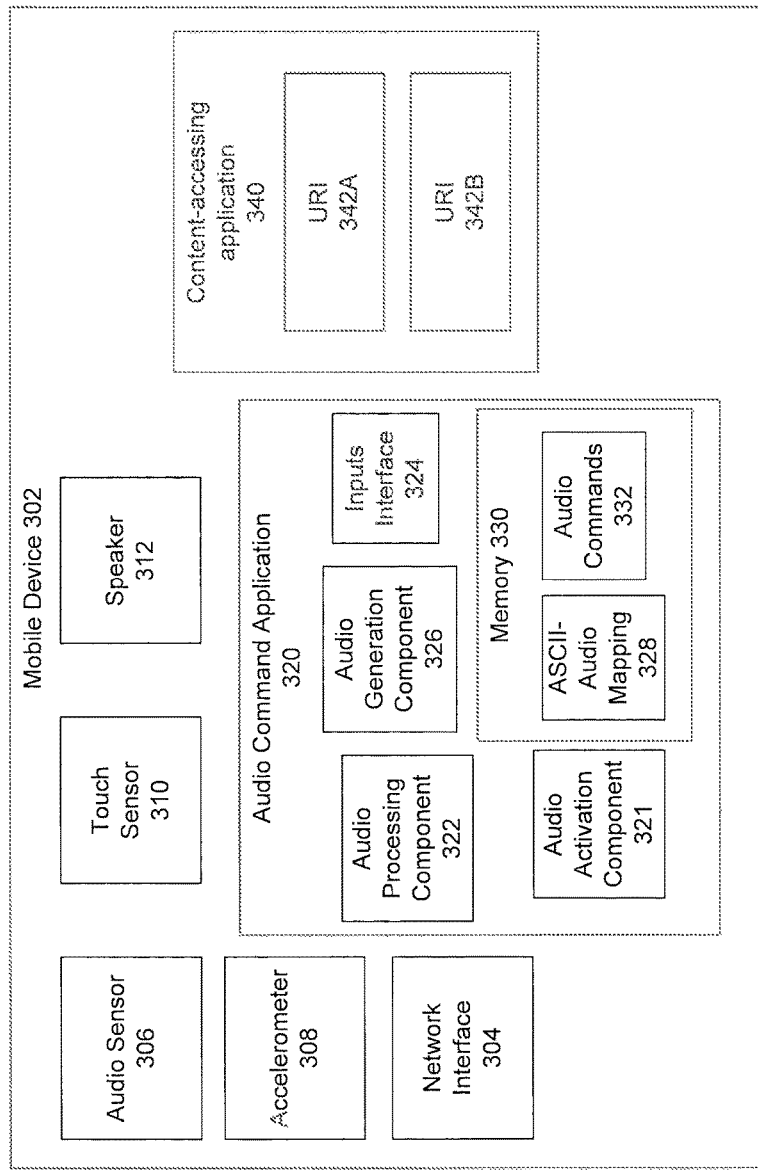
FIG. 3 is a block diagram of components within a mobile device, according to an example embodiment.

FIG. 3 is a block diagram 300 of components within mobile device 302, according to an example embodiment. Mobile device 302 may be an example of mobile device 118 of FIG. 1.

Network interface 224 of mobile device 302 may include receivers and transmitters to enable wireless communications between mobile device 302 and platform system 120 or content source systems 130. In an embodiment, network interface 224 may enable mobile device 302 to communicate with control device 116 or multimedia device 114. In an embodiment, network interface 224 may include circuitry for enabling a low-power wireless protocol, such as BLUETOOTH or another proprietary or custom protocol, for communicating with devices in close proximity, such as multimedia device 114 or control device 116.

Content-accessing application 340 may be a software web application installed on mobile device that enables a content consumer to access media content, including content stream 136, from content sources systems 130 of FIG. 1 across network 140. In an embodiment, content-accessing application 340 may present the content consumer with URI 342 that correspond to a specific content stream 136. For example, content-accessing application 340 may be a browser application that presents the content consumer with hyperlinks represented by URI 342. Upon the content consumer selecting a hyperlink, such as URI 342A, content-accessing application 340 may retrieve a corresponding content stream 136A, for example, a specific episode of a television series. In another example, content-accessing application 340 may be a video messaging application providing the content consumer with URI 342 representing an option to view a live video stream of another content consumer's mobile device.

In an embodiment, mobile device 302 may be configured to use network interface 304 to download or install audio command application 320 from platform system 120 of FIG. 1. Audio command application 320 may include audio activation component 321, audio processing component 322, inputs interface 324, audio generation component 326, and memory 330 containing audio commands 332 and ASCII-audio mapping 328. In an embodiment, audio command application 320 may be a plug-in or add-on application to content-accessing application 340.

Inputs interface 324 may be configured to enable audio command application 320 to access hardware devices available on mobile device 302. Available hardware devices may include, for example, audio sensor 306, accelerometer 308, touch sensor 310, or speaker 312.

In an embodiment, when audio command application 320 is running on mobile device 302, audio command application 320 may configure mobile device 302 to operate as control device 116 of FIG. 1. For example, mobile device 118 may be configured to perform the sound capturing and audio command generation functionality described with respect to control device 220 of FIG. 2, an exemplary control device 116. Therefore, audio sensor 306, accelerometer 308, touch sensor 310, audio activation component 321, and audio processing component 322 may each be configured to perform functionality corresponding to the similarly named counterparts in control device 220.

In an embodiment, audio command application 320 may be configured to enable a content consumer accessing content stream 136 via URI 342 to send an associated audio command to project and view content stream 136 on a larger and likely higher quality screen of display device 112. In an embodiment, audio command application 320 may prompt the content consumer to confirm whether an audio command is to be generated for viewing content stream 136. In an embodiment, the content consumer may select an option for accessing URI 342A, one of which is to generate an audio command.

Audio generation component 326 may be configured to generate an audio command as a sound by converting the selected URI 342 to an audio sequence in the time domain. In an embodiment, audio generation component 326 may use a hash function with ASCII-audio mapping 328 stored in memory 330 to convert URI 342 to the audio sequence.

In an embodiment, ASCII-audio mapping 328 may be a table or hash map data structure storing associations between ASCII characters and sound frequencies that may span a period of time. For example, the hash function may take an ASCII character as an input and output a corresponding stored sound frequency. In an embodiment, the input of the hash function may be additionally based on a location of the ASCII character within URI 342. And, the output of the hash function may be one or more frequencies and for a period of time. Moreover, the sound frequencies may be audible or inaudible, i.e. above 20 kHz. In an embodiment, ASCII-audio mapping 328 may contain frequencies within a certain range specified by platform system 120.

In an embodiment, upon generating the digitized audio sequence corresponding to URI 342, audio generation component 326 may be configured to request speaker 312 to play the digitized audio sequence as a sound. Therefore, mobile device 302 may be configured to provide the audio command via the sound to control device 116 or, in an embodiment, multimedia device 114. In an embodiment, if audio command application 320 enables functionality of control device 116, mobile device 302 may itself receive the sound generated by speaker 312 and detect or extract an associated audio command, further described with respect to FIG. 2.

In an embodiment, audio command application 320 may cache recent audio commands 332 that have been generated or store audio commands 332 that have yet to be issued. For example, a content consumer selecting URI 342A to view an associated media content, such as content stream 136A, may choose an option to view content associated with URI 342A on display device 112 at a later time. Therefore, upon generating an audio command associated with URI 342A, audio generation component 326 may add the audio command to a queue of audio commands 332 in memory 330.

In an embodiment, audio command application 320 may be activated via audio activation component 321 to enable audio sensor 306 to capture a sound and extract an audio command. When a portion of the sound representing the audio command is captured, audio processing component 322 may forward the audio command to control device 116 or multimedia device 114. Additionally, audio processing component 322 may cache the audio command in audio commands 332 to be sent to, for example, multimedia device 114 at a later time. Therefore, in addition to real-time generation of an audio command based on an accessed URI 342, audio command application 320 may store a queue or playlist of audio commands 332 to be issued by the content consumer.

Figure 4:
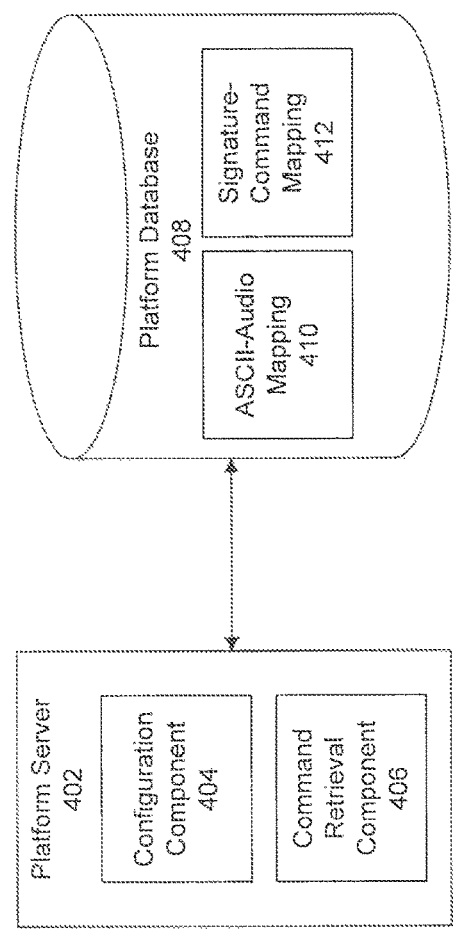
FIG. 4 is a block diagram of a platform system, according to an example embodiment.

FIG. 4 is a block diagram illustrating platform system 400, according to an example embodiment. Platform system 400 may be an example of platform system 120 of FIG. 1. In an embodiment, platform system 400 includes platform server 402 and platform database 408.

Platform database 408 may include ASCII-audio mapping 410 and signature-command mapping 412. In an embodiment, ASCII-audio mapping 410 may be a data structure, such as a hash table, configured to store associations between ASCII characters and audible or inaudible sound frequencies. Example embodiments for stored associations are described with respect to ASCII-audio mapping 328 of FIG. 3

Signature-command mapping 412 may be a data structure, such as a hash table, configured to store associations between an audio signature and an associated display command. In an embodiment, signature-command mapping 412 may be configured similar to signature-command mapping 216 of multimedia device 202 of FIG. 2. Signature-command mapping 412, however, may be a superset of signature-command mapping 216.

In an embodiment, platform database 408 may be configured to store platform information including, without limitation, network locations and content descriptions of content source systems 130, hardware/software capabilities of different firmware versions and specifications of multimedia device 114, customer information associated with multimedia device 114. The stored customer information may include demographic information, geographic information, internet service provider (ISP) identification information, financial information, and/or any other information that may be associated with customers or users of multimedia device 114.

Platform server 402 may include configuration component 404 and command retrieval component 406. Configuration component 404 may be configured to install or update respective components of multimedia device 114, mobile device 116, or control device 116, for performing audio command functionality. For example mobile device 302 may download audio command application 320 provided by configuration component 404 in order to enable audio command processing functionality on mobile device 302. In an embodiment, control device 116 may receive configuration updates via multimedia device 114.

In an embodiment, configuration component 404 may be configured to determine a unique audio signature to be associated with a display command for accessing content stream, such as content stream 136A. In an embodiment, configuration component 404 may receive from content server 132A of content source system 130A of FIG. 1 a reference or URI for accessing content stream 136A. Then, configuration component 404 may select a digitized audio sequence from content stream 136A to use as an audio command for accessing content stream 136A. In an embodiment, configuration component 404 may derive an audio signature from the digitized audio sequence and store the association between the audio signature and a display command for accessing content stream 136A in signature-command mapping 412. In an embodiment, configuration component 404 may receive a sound clip or the digital audio sequence to be associated with accessing content stream 136A directly from content source system 130A.

In an embodiment, although a digitized audio sequence translated to an audio signature may uniquely identify a content stream such as content stream 136A, content stream 136A may be associated with one or more digitized audio sequences. For example, a sound determined by content server 132A may be converted to an audio signature associated with a display command accessing content stream 136A. Additionally, configuration component 404 may use a URI or reference to content stream 136A to generate a potentially different audio signature associated with the same display command for accessing content stream 136A.

Command retrieval component 406 may be configured to receive an audio signature from multimedia device 114 of FIG. 1. Based on the received audio signature including a sequence of numbers, command retrieval component 406 may look up the audio signature in signature-command mapping 412 to locate or determine an associated display command. Then, command retrieval component 406 may send the retrieved display command from signature-command mapping 412 to multimedia device 114. As discussed, multimedia device 114 may be configured to use the display command to retrieve, for example, content stream 136A, and request or cause display device 112 to acoustically, graphically, and/or visually present content stream 136A on display device 112.

In an embodiment, command retrieval component 406 may further process the determined display command. For example, command retrieval component 406 may retrieve content information indicated by or associated with the display command from a content source system, such as content source system 130A of FIG. 1. The retrieved content information may include, for example, content media such as content stream 136A of FIG. 1 depending on the display command. So, command retrieval component 406 may send the retrieved display command, the retrieved content information, or both retrieved display command and content information to multimedia device 114.

Figure 5:
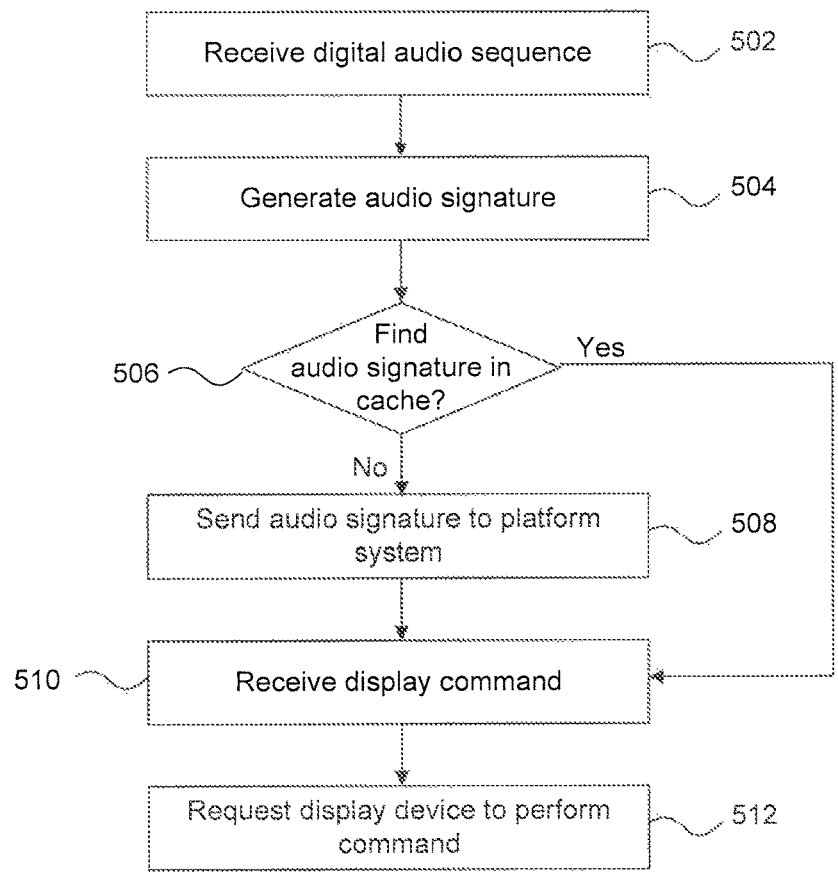
FIG. 5 is a flowchart of a method for processing an audio command by a multimedia device, according to an example embodiment.

FIG. 5 is a flowchart of a method 500 for processing an audio command by a multimedia device, according to an example embodiment. Method 500 can be performed by processing logic that may comprise hardware (e.g., circuitry, dedicated logic, programmable logic, microcode, etc.), software (e.g., instructions running on a processing device), or a combination thereof. In an embodiment, not all the steps may be performed and the steps performed may not need to be in the order specified. For example, if a multimedia device does not maintain a cache of audio signatures, then step 506 may be omitted from method 500.

In step 502, a receiver from a network interface of a multimedia device, such as from network interface 204 of multimedia device 202 of FIG. 2, receives a digitized audio sequence. The digitized audio sequence may be generated at and received from a control device, such as control device 220 of FIG. 2, and in an embodiment, from a mobile device, such as mobile device 302. The digitized audio sequence may be a digitized representation of a sound captured by the device generating the digitized audio sequence.

In step 504, a signature generation component of the multimedia device, such as signature generation component 210 of FIG. 2, generates an audio signature using the digitized audio sequence. In an embodiment, the signature generation component may derive the audio signature by first performing an FFT-based algorithm to convert the digitized audio sequence representing a signal the time domain to a corresponding representation in the frequency domain. Then, the signature generation component may, for example, calculate an area defined by the graph in the frequency domain to be the audio signature.

In step 506, a command retrieval component, such as command retrieval component 212 of multimedia device 202 of FIG. 2, attempts to find a display command based on the generated audio signature in a cache of commands in a memory, such as in memory 214 of FIG. 2. In an embodiment, associations between audio signatures and display commands, depicted as signature-command mapping 216, may be stored as a hash map in the cache of commands. The command retrieval component may attempt to use the audio signature as a key to look up an associated display command from the hash map. If no display command was found in the cache of the multimedia device, method 500 may proceed to step 508. In an embodiment, the multimedia device may not contain a cache of commands. In this scenario, step 506 may be omitted from method 500 and the audio signature generated in step 504 may flow directly to step 508.

In step 508, the command retrieval component sends the audio signature to a platform system, such as platform system 400 of FIG. 4, that determines the display command based on the digital audio signature. In an embodiment, the platform system may store many more associations between audio signatures and display commands than those cached in multimedia device 202, for example stored as signature-command mapping 412 in platform database 408 of FIG. 4. A platform server, such as platform server 402, in the platform system may look up a display command corresponding to the audio signature and send the display command back to the multimedia device.

In step 510, the command retrieval component may receive a display command either by: (1) the display command received from the platform system if the audio signature was sent to the platform system, i.e., step 508 was performed, or (2) if in step 506, the audio signature was a valid key and a corresponding display command was found in the cache. In an embodiment, the command retrieval component may receive from the platform system content information associated with the display command instead of or along with the display command.

In step 512, the command retrieval component requests that a display device operated by the multimedia device, such as display device 112 coupled to multimedia device 114 of FIG. 1, perform the display command. In an embodiment, the display command may contain a URI having a URL indicating a location of a content stream from a content source system, such as content stream 136A of content source system 130A. In this scenario, the command retrieval may retrieve the content stream via a network, such as network 140, and request the display device to provide the retrieved content stream. For example, the display device may display visual media content and/or play aural content.

In an embodiment where the command retrieval component receives content information from the platform system, the command retrieval component may cause the display device to provide content media related to the received content information. The content media may, in an example, be included in the content information.

Figure 6:
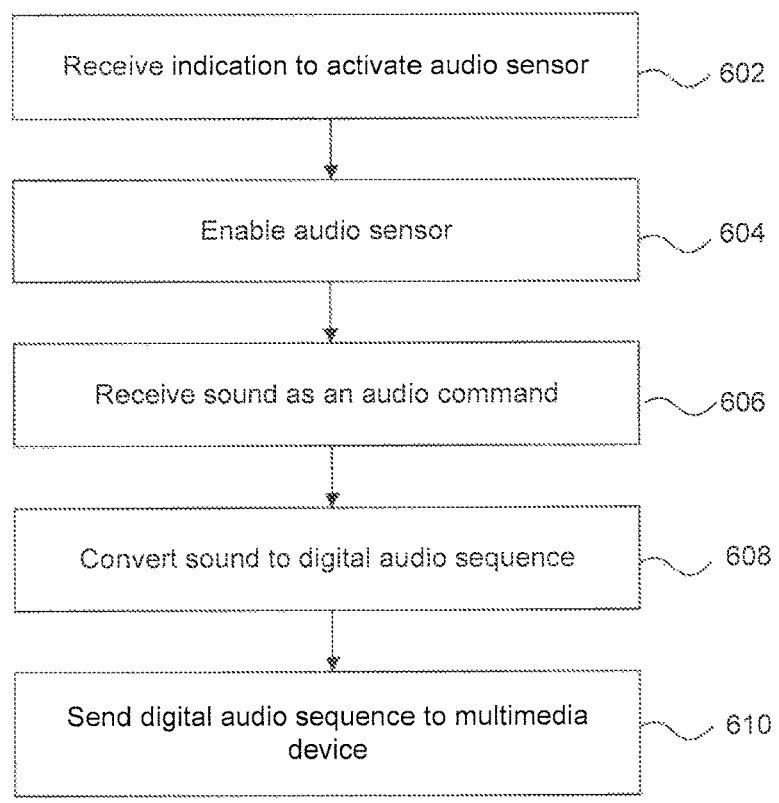
FIG. 6 is a flowchart of a method for detecting an audio command by a control device, according to an example embodiment.

FIG. 6 is a flowchart of a method 600 for detecting an audio command by a control device, according to an example embodiment. Method 600 can be performed by processing logic that may comprise hardware (e.g., circuitry, dedicated logic, programmable logic, microcode, etc.), software (e.g., instructions running on a processing device), or a combination thereof. In an embodiment, not all the steps may be performed and the steps performed may not need to be in the order specified.

In step 602, an audio activation component in a control device, such as audio activation component 232 in control device 220 of FIG. 2, receives an indication to activate an audio sensor, such as audio sensor 228. For example, the indication may be a signal from an accelerometer indicating that a content consumer is operating the control device. Other example indications may include a button press, audio activation, or capacitive sensing, each of which is detailed in the description of FIG. 2. In an embodiment, the audio activation component may detect the indication by actively polling sensors for indications.

In step 604, the audio activation component activates an audio sensor, such as audio sensor 228 (microphone) in FIG. 2, responsive to the received indication of step 602.

In step 606, the audio sensor receives or detects a sound as an audio command. In an embodiment, the audio sensor may detect a certain start sequence of frequencies as the start of the audio command. The audio command may extend a pre-determined period of time or the audio sensor may detect a certain end sequence of frequencies as the end of the audio command. The pre-determined period of time may be specified by, for example, the certain start sequence or by the platform system.

In an embodiment, the sound containing an audio command may be received from any sound-generating source. For example, the sound may be generated by a mobile device, such as mobile device 118 of FIG. 1, or by a display device, such as display device 112 of FIG. 1. In an embodiment, the microphone, an example audio sensor, of the control device may detect an audio command from a sound emitted by the television, an example display device, while a content consumer is viewing or listening to media content provided by the television. As discussed, the audio command may be associated with requesting the television to provide visually or aurally additional content related to the media content currently being viewed.

In step 608, an audio processing component, such as audio processing component 222 of FIG. 2, converts the received sound to a digitized audio sequence. The audio processing component and the audio sensor may each or together include analog-to-digital (ADC) circuitry to perform the conversion. In an embodiment, the audio processing component may include filtering circuitry, such as a band-pass or low-pass filter, to isolate a portion of the generated digitized audio sequence to reduce noise.

In step 610, a transmitter from a network interface on the control device, such as from network interface 224 of FIG. 2, sends the digitized audio sequence, representative of an audio command, to a multimedia device, such as multimedia device 202 of FIG. 2. Subsequently, as described above, method 500 may be performed by the multimedia device to request the display device to display a media content associated with a display command derived from the audio command.

As discussed, the control device may be, for example, a remote control configured to perform the steps of method 600. In an embodiment, a mobile device, such as mobile device 302 of FIG. 3, may include an audio command software application that causes the mobile device to perform the functionality of the control devices, i.e., the steps of method 600. For example, in step 602, the mobile device may contain various hardware sensors including an accelerometer or a touch sensor that each may provide an indication to an inputs interface 324 of the mobile device to activate an audio sensor on the mobile device.

In an embodiment, the steps of method 600 may be performed by a multimedia device, such as multimedia device 202 of FIG. 2. For example, in step 602, the multimedia device receives an indication to activate an audio sensor on the multimedia device. The multimedia device may not necessarily include, for example, an accelerometer for generating the indication. But, the indication may be received from other sources such as the control device. In an embodiment, the indication may be the multimedia device detecting that a coupled display device has been turned on. In another example, in step 610, upon generating a digitized audio sequence, an audio processing component of the multimedia device, such as audio processing component 209 of FIG. 2, sends the generated digitized audio sequence to a signature generation component, such as signature generation component 210 of FIG. 2.

Figure 7:
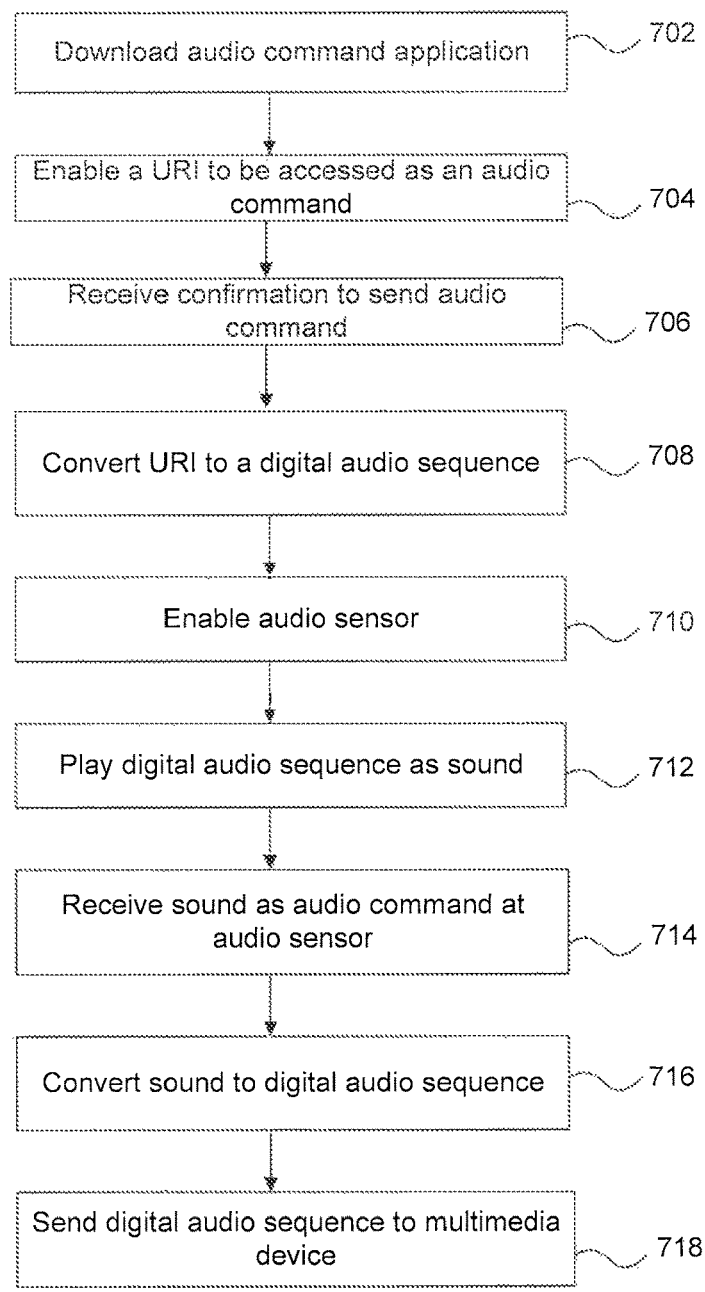
FIG. 7 is a flowchart of a method for generating and issuing an audio command by a mobile device, according to an example embodiment.

FIG. 7 is a flowchart of a method 700 for generating and issuing an audio command by a mobile device, according to an example embodiment. Method 700 can be performed by processing logic that may comprise hardware (e.g., circuitry, dedicated logic, programmable logic, microcode, etc.), software (e.g., instructions running on a processing device), or a combination thereof. In an embodiment, not all the steps may be performed and the steps performed may not need to be in the order specified.

In step 702, a mobile device, such as mobile device 302 of FIG. 3, downloads and stores an audio command application, such as audio command application 320 of FIG. 3, from a platform system, such as platform system 400 of FIG. 4. In an embodiment, the audio command application may be a plug-in for a content-accessing application, such as content-accessing application 340 of FIG. 3. The content-accessing application may be, for example, a messaging application or a browser application. In an embodiment, the audio command application may be executed by the mobile device to perform, for example, the steps of method 600.

In step 704, the audio command application enables a URI, such as URI 342A of FIG. 3, to be accessed as an audio command as opposed to querying for media content associated with the URI via a network interface, such as network interface 304, of the mobile device. For example, if the content-accessing application is a browser application, the audio command application may enable a URI represented as a hyperlink or URL on the page to be optionally accessed as an audio command.

In step 706, an audio generation component, such as audio generation component 326 of FIG. 3, may receive a confirmation from a content consumer that the URI is to be accessed as an audio command. In an embodiment, step 706 for confirmation may be omitted and upon selecting the URI, the audio component application may initiate steps, starting at step 708, for issuing an audio command to a multimedia device, such as multimedia device 200 of FIG. 2, for displaying media content referenced by the URI on a display device, such as display device 112 of FIG. 1.

In step 708, the audio generation component may convert the URI, such as a web address or URL, to a digitized audio sequence based on an association table, such as ASCII-audio mapping 328 stored in audio command application 320 of FIG. 3 and provided by platform system 400 of FIG. 4. The association table may store mappings between ASCII characters and possible sub-sequences of a digitized audio sequence. In an embodiment, an ASCII character of the URI and the position of the ASCII character within the URI may be used in the mapping to generate the digitized audio sequence.

In step 710, an audio activation component, such as audio activation component 321 of FIG. 3, enables an audio sensor, such as audio sensor 306 (microphone) on mobile device 302 of FIG. 3. The audio activation component may activate the audio sensor responsive to receiving the confirmation in step 706. Therefore, step 710 may be performed before or concurrently with step 708.

In step 712, the audio generation component may send the generated digitized audio sequence to be played as a sound via a speaker, such as speaker 312 of FIG. 3.

In step 714, the enabled audio sensor may receive the sound as an audio command. Step 714 may correspond to step 606, which describes similar functionality.

In step 716, an audio processing component, such as audio processing component 322 of FIG. 3, may cooperate with the audio sensor to convert the sound to a digitized audio sequence. Step 716 may correspond to step 608, which describes similar functionality.

In step 718, the audio command application may send the digitized audio sequence generated at the audio generation component to the multimedia device for further audio command processing. Step 718 may correspond to step 610, which describes similar functionality. Subsequently, method 500 may be performed by the multimedia device to request the display device to display a media content associated with a display command derived from the audio command.

Figure 8:
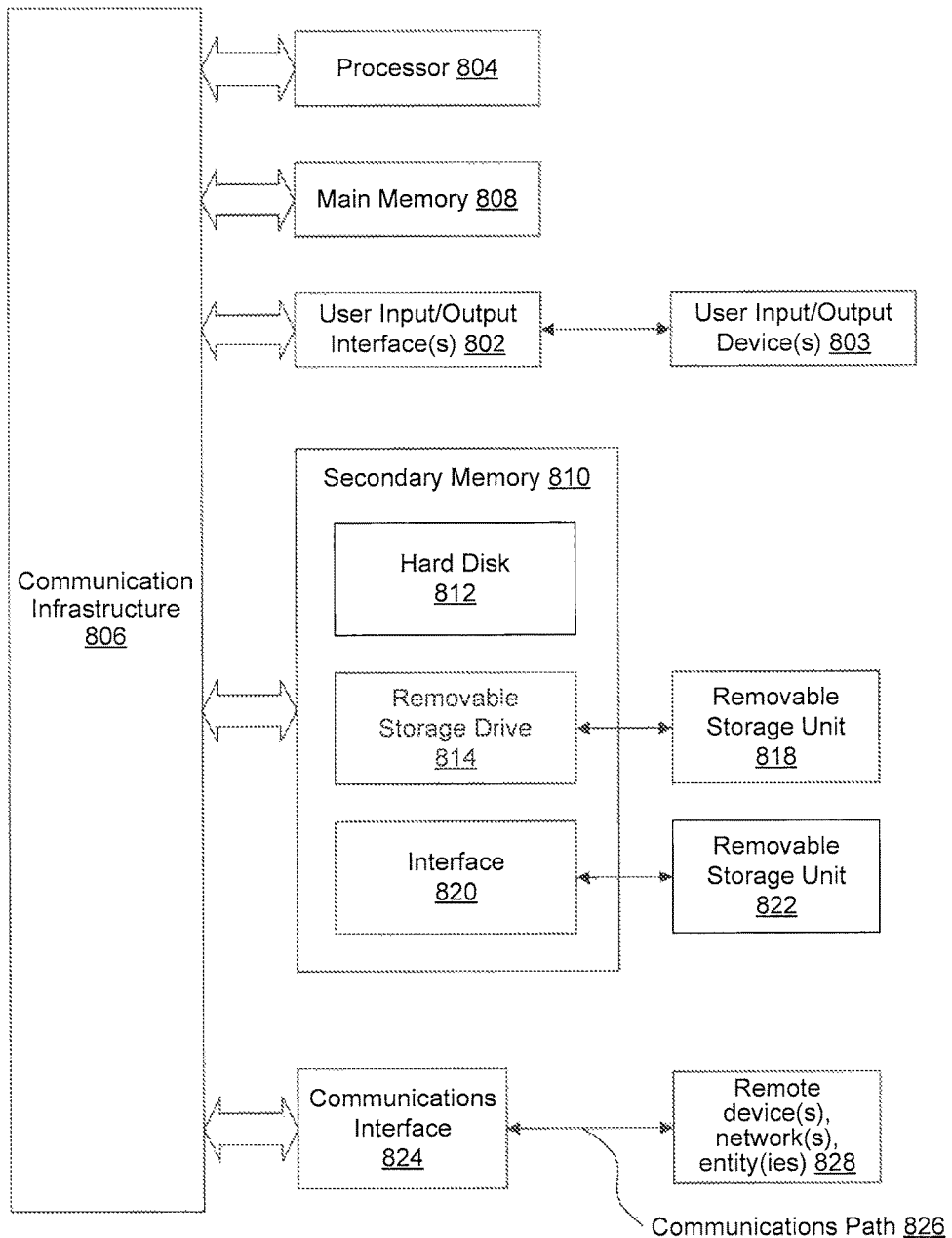
FIG. 8 is a diagram illustrating an example computing system, according to an embodiment.

Various embodiments can be implemented, for example, using one or more well-known computer systems, such as computer system 800 shown in FIG. 8. For example, the display devices, multimedia devices, control devices, mobile devices, content servers, and platform servers described above may each be implemented as at least one computer system 800. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The breadth and scope of the invention should not be limited by any of the above-described exemplary embodiments, but should be defined only in accordance with the following claims and their equivalents.

What is claimed is:

1. A method, comprising:
    receiving, by a wireless network interface of a multimedia device, a digitized audio sequence from a wireless network interface of a control device, the digitized audio sequence associated with a display command for controlling a display device, wherein the display command includes a uniform resource indicator (URI) which is received from a web application operated by the control device and the URI was converted into the digitized audio sequence by the control device, wherein receiving the URI comprises:
        receiving the digitized audio sequence played by a speaker of the control device, wherein the speaker is caused, by the control device, to play a sound represented by the digitized audio sequence;
    converting, by the multimedia device, the digitized audio sequence into an audio signature that corresponds to the digitized audio sequence;
    performing, by the multimedia device, a search of a storage module on the multimedia device using the audio signature;
    in response to the search failing to locate the audio signature in the storage module:
        sending, by the multimedia device, the audio signature to a platform server; and
        receiving the display command from the platform server;
    retrieving the display command from the storage module in response to the search locating the audio signature in the storage module;
    receiving, by the wireless network interface of the multimedia device, content information based on the URI included in the display command, wherein the content information indicates media content; and
    causing, by the multimedia device, the display device to display the media content based on the display command.

2. The method of claim 1, wherein
    converting the URI into the digitized audio sequence comprises using an ASCII-audio mapping defined by the platform server.

3. The method of claim 1, wherein the URI indicates a location of the media content on the Internet, and wherein the content information includes the media content retrieved by the platform server from the indicated location.

4. The method of claim 1, further comprising:
    detecting, by an audio sensor on the multimedia device, the sound represented by the digitized audio sequence, wherein the sound is associated with the display command; and
    transforming the sound into the digitized audio sequence.

5. The method of claim 4, further comprising:
before detecting, determining whether to activate the audio sensor based on an activation signal received from the control device or the display device.

6. The method of claim 1, wherein the digitized audio sequence is associated with an ordered list of media content to be provided by the display device.

7. The method of claim 1, wherein the sound is in a time domain for a period of time, the converting comprising:
performing a Fast Fourier Transform (FFT) algorithm on the digitized audio sequence to obtain a frequency domain representation of the sound;
calculating an area defined by a graph generated in the frequency domain representation; and
determining the audio signature to be the calculated area.

8. The method of claim 1, further comprising:
receiving, from the platform server, a second audio signature and a second display command associated with the second audio signature;
caching, within a hash map, the second audio signature as a key for obtaining the second display command;
obtaining, from the hash map, the second display command as the display command if the audio signature is the same as the second audio signature; and
retrieving the media content based on the second display command.

9. A system, comprising:
a multimedia device including a memory, a wireless network interface, and a processor configured to:
receive, via the wireless network interface, a digitized audio sequence from a wireless network interface of a control device, the digitized audio sequence associated with a display command for controlling a display device, wherein the display command includes a uniform resource indicator (URI) which is received by the control device from a web application operated by the control device and the URI was converted into the digitized audio sequence by the control device, and wherein to receive the URI the processor is configured to:
receive the digitized audio sequence played by a speaker of the control device, wherein the speaker is caused, by the control device, to play a sound represented by the digitized audio sequence;
convert the digitized audio sequence into an audio signature that corresponds to the digitized audio sequence;
perform a search of a cache on the multimedia device using the audio signature;
in response to the search failing to locate the audio signature in the cache:
send the audio signature to a platform server; and
receive the display command from the platform server;
retrieve the display command from the cache in response to the search locating the audio signature in the cache;
receive, by the wireless network interface of the multimedia device, content information based on the URI included in the display command, wherein the content information indicates media content; and
cause the display device to display the media content based on the display command.

10. The system of claim 9, wherein
converting the URI into the digitized audio sequence comprises using an ASCII-audio mapping defined by the platform server.

11. The system of claim 9, wherein the URI indicates a location of the media content on the Internet, and wherein the content information includes the media content retrieved by the platform server from the indicated location.

12. The system of claim 9, further comprising an audio sensor, and wherein the processor is further configured to:
detect, by the audio sensor, the sound represented by the digitized audio sequence, wherein the sound is associated with the media content; and
transform the sound into the digitized audio sequence.

13. The system of claim 12, wherein the processor is further configured to:
before detect, determine whether to activate the audio sensor based on an activation signal received from the control device or the display device.

14. The system of claim 12, wherein the digitized audio sequence is associated with an ordered list of media content to be provided by the display device.

15. The system of claim 9, wherein the sound is in a time domain for a period of time, and wherein the processor configured to convert is further configured to:
perform a Fast Fourier Transform (FFT) algorithm on the digitized audio sequence to obtain a frequency domain representation of the sound;
calculate an area defined by a graph generated in the frequency domain representation; and
determine the audio signature to be the calculated area.

16. The system of claim 9, wherein the processor is further configured to:
receive, from the platform server, a second audio signature and a second display command associated with the second audio signature;
cache, within a hash map in the memory, the second audio signature as a key for obtaining the second display command;
obtain, from the hash map, the second display command as the display command if the audio signature is the same as the second audio signature; and
retrieving the media content based on the second display command.

17. A non-transitory computer-readable device having instructions stored thereon that, when executed by at least one computing device, causes the at least one computing device to perform operations comprising:
receiving, by a wireless network interface of a multimedia device, a digitized audio sequence from a wireless network interface of a control device, the digitized audio sequence associated with a display command for controlling a display device, wherein the display command includes a uniform resource indicator (URI) which is received by the control device from a web application operated by the control device and the URI was converted into the digitized audio sequence by the control device, wherein receiving the URI comprises:
receiving the digitized audio sequence played by a speaker of the control device, wherein the speaker is caused, by the control device, to play a sound represented by the digitized audio sequence;
converting the digitized audio sequence into an audio signature that corresponds to the digitized audio sequence;
performing a search of a cache using the audio signature;
in response to the search failing to locate the audio signature in the cache:
sending the audio signature to a platform server; and
receiving the display command from the platform server;

retrieving the display command from the cache in response to the search locating the audio signature in the cache;

receiving, by the wireless network interface of the multimedia device, content information based on the URI included in the display command, wherein the content information indicates media content; and causing, by the multimedia device, the display device to display the media content based on the display command.

18. The computer-readable device of claim 17, the operations further comprising:

determining whether to activate an audio sensor based on an activation signal received from the control device or the display device;

detecting, by the audio sensor, the sound represented by the digitized audio sequence, wherein the sound is associated with the media content; and transforming the sound into the digitized audio sequence.

19. The computer-readable device of claim 17, wherein the sound is in a time domain for a period of time, the converting comprising:

performing a Fast Fourier Transform (FFT) algorithm on the digitized audio sequence to obtain a frequency domain representation of the sound;

calculating an area defined by a graph generated in the frequency domain representation; and determining the audio signature to be the calculated area.

20. The computer-readable device of claim 17, the operations further comprising:

receiving, from the platform server, a second audio signature and a second display command associated with the second audio signature;

caching, within a hash map, the second audio signature as a key for obtaining the second display command;

obtaining, from the hash map, the second display command as if the audio signature is the same as the second audio signature; and retrieving the media content based on the second display command.

* * * * *